(12) United States Patent
Stichnoth (10) Patent No.: US 7,904,881 B2
(45) Date of Patent: Mar. 8, 2011

(54) USING A VIRTUAL STACK FOR FAST AND COMPOSABLE STACK CUTTING

(75) Inventor: James M. Stichnoth, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1249 days.

(21) Appl. No.: 11/493,718

(22) Filed: Jul. 26, 2006

(65) Prior Publication Data

US 2008/0028379 A1    Jan. 31, 2008

(51) Int. Cl.
G06F 9/44 (2006.01)
(52) U.S. Cl. .......................... 717/114; 717/118; 717/148
(58) Field of Classification Search .......... 717/114–140, 717/148
See application file for complete search history.

(56) References Cited

U.S. PATENT DOCUMENTS

| | | | | |
|---|---|---|---|---|
| 5,628,016 A * | 5/1997 | Kukol | ............................ | 717/140 |
| 6,009,258 A * | 12/1999 | Elliott | ............................ | 703/22 |
| 6,173,421 B1 * | 1/2001 | Weaver Johnson et al. | .... | 714/38 |
| 6,272,521 B1 * | 8/2001 | Jablonski et al. | ............. | 709/200 |
| 6,289,446 B1 * | 9/2001 | Nilsson | ........................ | 712/244 |
| 6,293,712 B1 * | 9/2001 | Coutant | ........................ | 717/155 |
| 6,550,058 B1 * | 4/2003 | Wynn | ............................ | 717/158 |
| 6,883,165 B1 * | 4/2005 | Blandy et al. | ................. | 717/148 |
| 6,892,379 B2 * | 5/2005 | Huang | ........................... | 717/140 |
| 6,934,939 B2 * | 8/2005 | Ewart et al. | .................... | 717/152 |
| 7,496,896 B2 * | 2/2009 | Bley et al. | ..................... | 717/127 |
| 7,496,897 B1 * | 2/2009 | Dibble et al. | ................. | 717/127 |
| 2003/0023905 A1 * | 1/2003 | Boling | ............................ | 714/34 |
| 2004/0083460 A1 * | 4/2004 | Pierce | ........................... | 717/131 |
| 2004/0128658 A1 * | 7/2004 | Lueh et al. | ..................... | 717/151 |
| 2005/0086451 A1 * | 4/2005 | Yates et al. | ..................... | 712/32 |
| 2005/0086650 A1 * | 4/2005 | Yates et al. | ..................... | 717/139 |
| 2005/0108736 A1 * | 5/2005 | Schwabe et al. | .............. | 719/331 |

OTHER PUBLICATIONS

"How a C++ compiler implements exception handling", Vishal Kochhar, The Code Project Open License, Apr. 15, 2002. Kochhar. pdf.*
"Anomaly Detection Using Call Stack Information", Henry Hanping Feng, Oleg m. Kolesnikov, Prahad Fogla, Wenke Lee, Weibo Gong, IEEE Computer Society, Washington, DC. 2003. Feng.pdf.*

* cited by examiner

Primary Examiner — Wei Y Zhen
Assistant Examiner — Phillip H Nguyen
(74) Attorney, Agent, or Firm — Blakely, Sokoloff, Taylor & Zafman LLP (57) ABSTRACT

Embodiments of a system and method for facilitating the use of stack cutting to be used in programming languages in a safe fashion even when composed with constructs that require destructor operations are described. For stack-based operations that require resolution through destructor operations (such as transactions, synchronization operations, deallocations, unlock operations, and the like), the destructor objects are stored in a virtual stack that is associated with the system stack, for use when a stack cut operation is performed. A container data structure stores an instantiation of the execution state at the cut back point. A virtual stack head pointer stores the location of the last destructor in the virtual stack. During a stack cut operation, the virtual stack is first unwound to execute the destructor operations until the stack frame of the container is reached. Other embodiments are described and claimed.

15 Claims, 4 Drawing Sheets

202
k
eip = <present value>
esp = <present value>
ebp = <present value>
vsh = e1

FIGURE 4 ations in man-
USING A VIRTUAL STACK FOR FAST AND COMPOSABLE STACK CUTTING

FIELD OF THE INVENTION

Embodiments are in the field of software programs, and particularly in the field of managing stack operations in managed languages.

BACKGROUND OF THE DISCLOSURE

There is an increased trend in writing software using managed languages in order to improve productivity and reduce the incidence of certain classes of bugs. Managed languages, such as Java and C++, generally include mechanisms for exchanging information between the program and the runtime environment for interprocedural control flow. At any point of execution, the runtime can stop the CPU (Central Processing Unit) and retrieve information specific to the current CPU instruction address, and runtime state, such as register or stack contents.

With regard to exception flow control processing, there are two basic methods of managing stack operations: stack unwinding (exception throwing) and stack cutting. Stack unwinding is typically provided as a mechanism in most managed languages and works by unwinding stack frames one at a time until a handler for the exception is found, and then discarding intervening stack frames and resuming execution at the handler. This method is generally safe and facilitates program composability, which is the ability to define and combine program components without undue side effects; however, it can be fairly expensive in terms of processor overhead if the handler is far from the exception entry point. Stack cutting is generally faster than exception throwing, and works by directly resuming execution according to a snapshot of an execution state that was previously taken, and discarding intervening stack frames. Stack cutting is explicitly provided in some languages, such as continuations in certain functional languages. It can also be implicit in some language constructs. For example, in a transactional memory construct, there is the expectation that a data conflict will roll back the transactional state and restart the transaction, which may involve cutting back several stack frames from the point of the data conflict to the beginning of the transaction. Though the stack cutting method requires the definition of a data structure to hold the execution context and an associated call chain, the cut operation itself is typically very fast.

Many language constructs require a "destructor" or "undo" operation when control flow exits the construct. Thus, if an object is declared locally within a function, the function usually contains code necessary to do the destructor operation to remove the object. For example, in Java or C#, when leaving a synchronized method or block, the synchronization object needs to be unlocked. Likewise, when leaving a transactional block in a transactional memory system, the transaction needs to be closed or ended. The exception throwing process is based on stack unwinding, which provides for the examination of every intervening stack frame between the throw and the handler. As such, it is relatively easy to design a mechanism for marking destructor operations in each stack frame and making sure the destructors are executed when doing an exception unwind. Stack cutting, however, operates quite differently and is generally considered to have a constant time for setting up and jumping to the new execution context, which precludes frame-by-frame stack walking. This cheaper cost model is why stack cutting is often used instead of exception throwing. However, stack cutting is often a risky and dangerous construct and must be used with great care, since the implementation simply ignores and discards destructor operations in intervening stack frames. For example, if an "end-transaction" command is in an intermediate stack frame that is ignored and discarded by a stack cut operation, a transaction could be left open, thus leading to a deadlock situation. Therefore, despite its ability to provide performance advantages, using stack cutting in present systems can be problematic and dangerous. Moreover, present stack cutting implementations are generally not composable with other constructs since mechanisms are not provided to ensure that any pending processes are properly resolved during a stack cut operation.

DETAILED DESCRIPTION

Embodiments described herein facilitate the use of fast stack cutting to be used in programming languages in a safe fashion even when composed with constructs that require destructor operations. For stack-based operations that require resolution through destructor operations (such as transactions, synchronization operations, deallocations, unlock operations, and so on) when a cut back is attempted, the destructor objects are stored in a virtual stack that is associated with the system stack. A container data structure stores an instantiation of the execution state at the cut back stack frame. A virtual stack head pointer stores the location of the last destructor in the virtual stack. During a stack cut operation, the virtual stack is first unwound to execute the destructor operations until the stack frame of the container is reached. The virtual stack mechanism generally provides a performance improvement over techniques like exception throwing whose cost is proportional to the number of stack frames traversed.

Embodiments can be used in conjunction with various types of computer languages, such as C, C++, C#, Java, or any proprietary language, or any managed or functional language that provides interprocess control consisting of stack operations.

Figure 1:
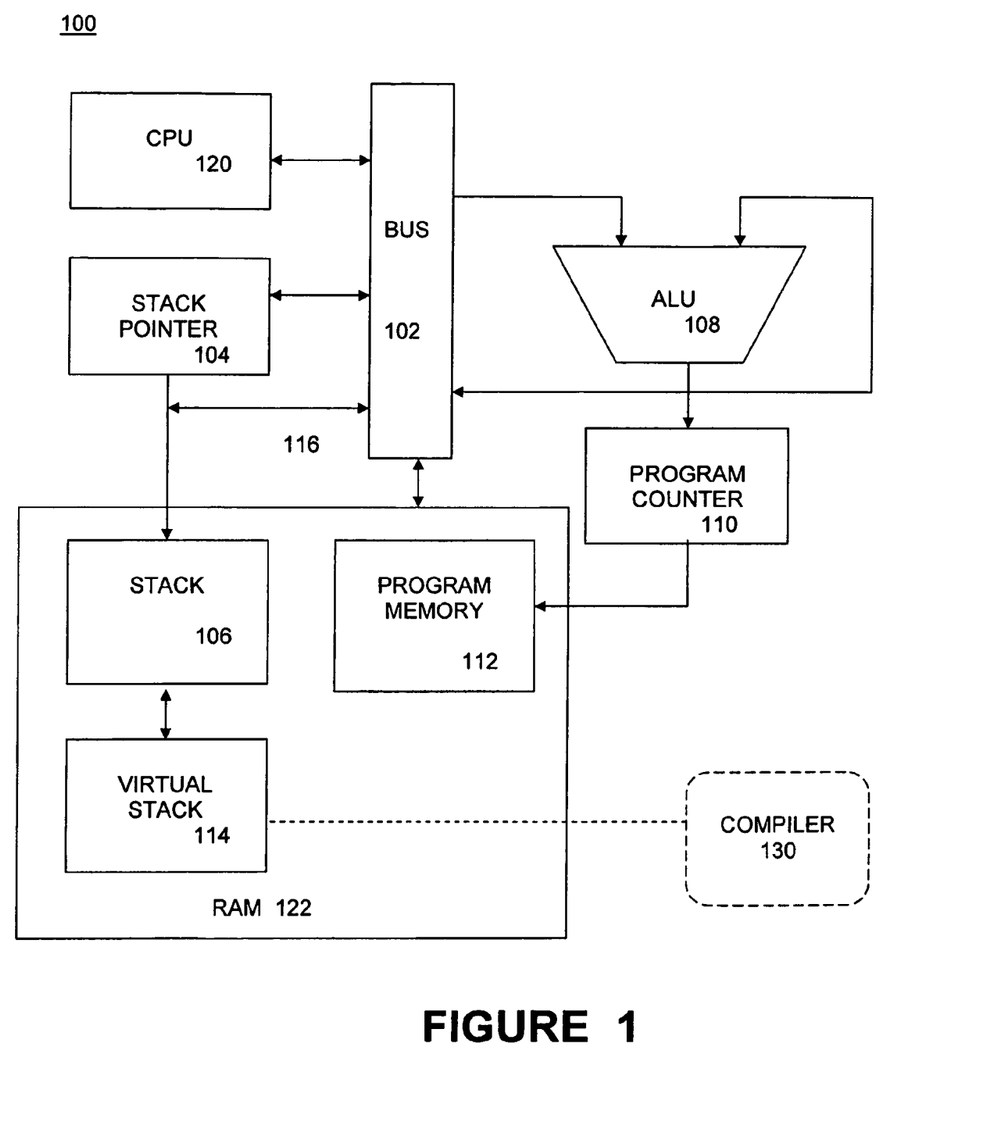
FIG. 1 is a block diagram of a stack based computer system and associated compiler, according to an embodiment.

FIG. 1 is a block diagram of elements of a stack based computer system 100 including a virtual stack 114, along with an associated compiler, according to an embodiment. FIG. 1 is a partial block diagram of an example of a computer system in which embodiments of the invention may be practiced. The system 100 may includes several components of the computer, and may be embodied on a motherboard, or on one or more integrated circuit devices comprising the computer circuitry. As shown in FIG. 1, system 100 includes at least a bus 102, a central processing unit (CPU) 120, an arithmetic logic unit (ALU) 108, a program counter 110, and a program memory 112. The bus 102 represents one or both of an address and data bus of the computer. The ALU 108 may be part of the execution unit of the CPU 120, or a separate unit, and performs a wide variety of basic arithmetical computations and logic operations on the data processed by the CPU. The ALU operates on data provided by bus 102 in accordance with instructions stored in program memory 112. Program memory 112 can be configured to store any type of program instructions, such as high-level program code, microinstructions, firmware, BIOS (Basic Input/Output System) code, and so on, or any combination thereof. A program counter 110 points to the address of the current instruction in program memory being executed and indicates where the computer is in its instruction sequence. For the embodiment shown, program memory 112 is shown as residing in the main Random Access Memory (RAM) 122 of the computer. RAM 122 can also be configured to hold several other components of the computer, such as stack 106, virtual stack 114, and even some of the other components that may be illustrated as outside of RAM 122, such as stack pointer 104 and program counter 110.

In an embodiment, system 100 includes a system stack 106 that comprises a data structure embodied in an area of memory 122 that temporarily stores data that is accessed in a Last-In/First-Out (LIFO) manner. The stack stores the results of the ALU operations, as well as various other data objects or entries, such as data that is local to a procedure, information about a procedure, arguments, program addresses, and the like. Stack 106 can represent a data stack, return stack, or any other similar stack or combination thereof. A stack pointer 104 is a hardware register or equivalent mechanism that references a current location of the stack for push operations that add a data entry to the top of the stack, or pop operations that remove the current data entry from the top of the stack. In one embodiment, the stack 106 stores entries in a series of frames that start at a fixed memory location and expand toward lower or higher addresses. The stack pointer 104 holds the address of the current top frame of the stack. Address information is provided to the bus over line 116 and stack data is provided to the bus over the same line, or a separate line to the bus. Other components, not shown, can also be also be considered to be part of computer 100, such as Input/Output (I/O) interfaces, memory controller interfaces, buffers, multiplexers, and so on.

During exception processing by the CPU, an instruction or procedure may be executed out of sequence, such as when an interrupt signal causes a program to halt and execute an interrupt handler routine. Exception processing may result in additional entries placed in the stack that are outside of the sequence of normal program execution. In order to resume normal program execution upon resolution of the exception condition, it is necessary to restore the processor to its context or state just prior to the exception. In one embodiment, the context or state of the processor comprises the contents of the program counter and the stack counter. The stack unwinding method unwinds stack frames one at a time until a handler for the exception is found. The intervening stack frames are then discarded and execution is removed at the handler. This method requires that each frame between the exception throw and handler be examined, thus resulting in potentially significant processor overhead. A faster method of performing stack operations in exception processing is the stack cutting method. Stack cutting generally operates by jumping to the new execution context without examining any intervening frames, however, this method can be dangerous since constructs or processes can be left unresolved if any destructors are left unexecuted in ignored intervening frames.

Embodiments are directed to facilitating the use of stack cutting methods in managed or functional languages by providing safety mechanisms for stack cut operations and enhancing the composability of stack cutting, in general. In one embodiment, a virtual stack 114 is employed to ensure the safe use of stack cutting. As stated above, stack cutting directly resumes execution of the program according to an instantiation (snapshot) of the context that was previously taken and discarding intervening stack frames. Some language constructs may require a destructor or undo operation when control flow exits the construct. If the intervening frames include any destructor or undo operations, a stack cut may ignore and discard such an operation, thus leaving a construct or procedure unresolved. The virtual stack 114 comprises an auxiliary data structure in memory that is configured to hold the set of destructor operations that must be performed as part of a stack cut. The virtual stack 114 may be a separate data structure from the main stack 106, or it may be a portion of the stack 106.

In one embodiment, the virtual stack 114 is generated by code produced by compiler 130, which is typically implemented as a computer program that is external to computer 100. The virtual stack 114 is implemented in memory 122 as a singly-linked list data structure, though other representations, such as a double-linked lists are also possible. Each virtual stack element contains some data representing the parameters of the destructor operation, plus a pointer to the next virtual stack element, or a null pointer if the present element is the last element. The storage for each virtual stack element could be heap-managed through constructs such as malloc( )/free( ); alternatively the main stack 106 can be used to hold the virtual stack elements. During operation, the process unwinds the virtual stack to execute the destructor operations without requiring the main stack to be unwound.

Figure 2A:
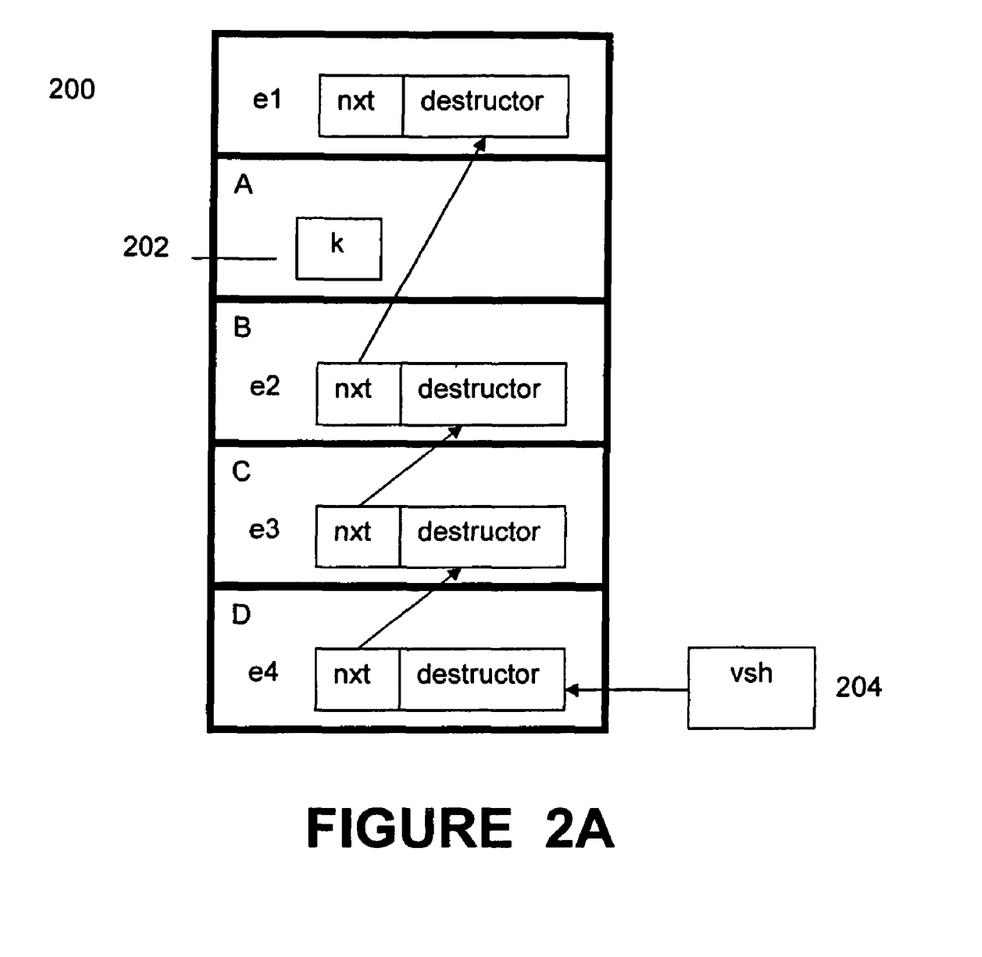
FIG. 2A illustrates an example of a virtual stack associated with a system stack, according to an embodiment.

FIG. 2A illustrates an example of a virtual stack associated with a system stack, according to an embodiment. The system stack 200 contains a number of frames, including certain frames denoted A, B, C, and D. It is assumed that some of these frames contain operations that involve a destructor or undo operation, i.e., an end transaction operation. Associated with these frames are virtual frame entries that store the appropriate destructor operation. Thus, as shown in FIG. 2A, frame B has virtual stack element e2, frame C has virtual stack element e3, and frame D has virtual stack element e4. The destructor within each virtual stack element ends the transaction within the associated system stack frame, and the next (nxt) element points to the next sequential destructor operation to be executed. As shown in FIG. 2A, this corresponds to the destructor that resolves the transaction in a previous system stack frame. Because of the Last-In/First-Out nature of the stack, the destructor operations are performed in the reverse order that they were pushed onto the stack, thus matching the natural order they would have been executed had there been no stack cut.

Figure 2B:
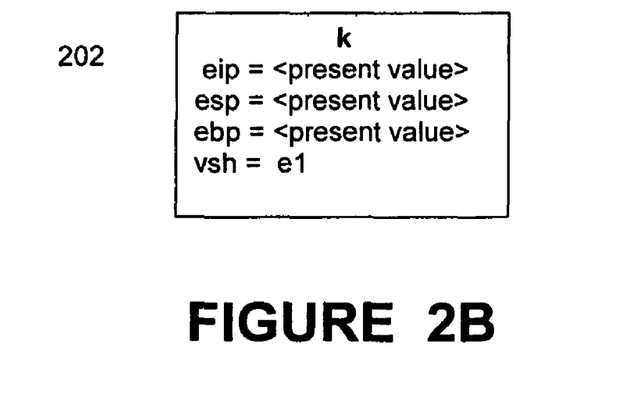
FIG. 2B illustrates an example of a continuation element for the virtual stack of FIG. 2A, under an embodiment.

The parameters of a stack cut are stored in a continuation element (container) denoted "k" 202. The continuation is a data structure that stores relevant data pertaining to the thread context, and represents the place where the stack is cut to during a stack cutting operation. FIG. 2B illustrates an example of a continuation element for the virtual stack of FIG. 2A, under an embodiment. Container 202 stores the present value of element such as the instruction pointer (eip), stack pointer (esp), frame pointer (ebp), as well other relevant information, such as possibly the values of preserved registers. To support the virtual stack, the container 202 also contains the value of the virtual stack head (VSH). To execute a stack cut to a continuation, the relevant values of the thread context are loaded from the continuation, and control is transferred to the present value of the instruction pointer (eip) stored in the continuation.

The head of the virtual stack is stored in a virtual stack head (VSH or vsh) element 204. The VSH is stored as part of the thread context, and can be in the form of a preserved register, or in thread-local storage (TLS). For purposes of the present description, it is assumed that the head of the virtual stack is stored in TLS. When a virtual stack element is added, the TLS value is updated to point to the new element. When the top element is deleted, the TLS value is updated to point to the old top element's next pointer. For the example shown in FIG. 2A, the VSH 204 points to frame D of virtual stack 200. The value of the vsh field in the container, however, is set to the virtual stack head value when the container was created, in this case e1. As destructor elements are added to the virtual stack during normal processing the difference between the current value of vsh and the value of vsh in the container gives an indication of the destructor elements that have been added in that period of time. The actual destructor elements can be stored in any type of suitable representation and in any memory locations, such as in the system stack itself or similar memory structure. The destructor could be any type of destructor element that itself ends a transaction, unlocks an object, deallocates the stack, and so on, or it can incorporate a pointer that locates a handler to perform the destructor task.

When performing a stack cutting operation, before updating the thread context values, the system checks the value of the current virtual stack head against the value in the continuation data structure. If they are the same, then no action needs to be taken. If they are different, then there are pending destructors that must be executed. Before performing the stack cut operation, virtual stack elements are popped from the virtual stack and corresponding destructor operations are executed, until the virtual stack head becomes equal to the value in the continuation data structure. If the virtual stack head is the same as the value in the continuation, then no destructor operations need to be run during the cut. In this case, the virtual stack adds minimal overhead to the stack cutting infrastructure.

Figure 3A:
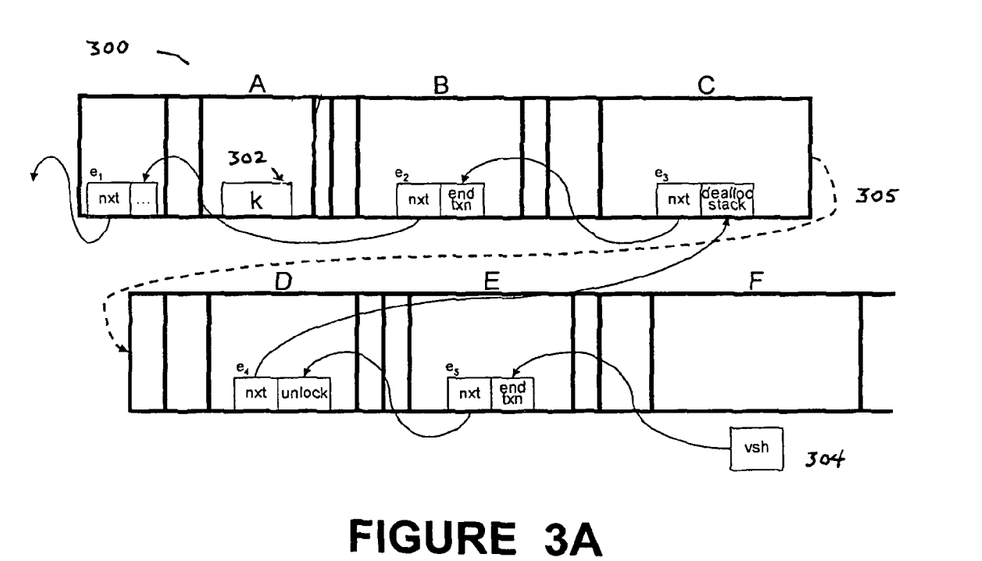
FIG. 3A illustrates an example of a stack cutting operation using a virtual stack, according to an embodiment.

FIG. 3A illustrates an example of a stack cutting operation using a virtual stack, according to an embodiment. The example of FIG. 3 shows the values of the system stack and the virtual stack after a particular series of operations occurs in a particular example program. The frames 300 represent stack frames on the system stack, and certain stack frames are specifically identified with labels A-F according to which method created the stack frame. The virtual stack elements are labeled $e_1$ through $e_5$, and the arrows show the linkage between the virtual stack elements. Box "k" 302 represents a continuation that happened to be allocated on the stack during a process executed in frame A. It should be noted that the continuation can also have been allocated on the heap or from global space. In one embodiment, the contents of the continuation 302 correspond to the structure illustrated in FIG. 2B.

For the example of FIG. 3A, during frame A, the continuation k 302 is created. The vsh field of the continuation field is set to the current value of the virtual stack head, which in this case is $e_1$ (as shown in FIG. 2B). The frame A process starts a call chain which calls the process in frame B. Within frame B, a transaction is started, so an "end transaction" marker, $e_2$, is pushed onto the virtual stack. Within this transaction, a call chain is started which calls a process in frame C. The prolog of frame C finds that the remaining stack space is insufficient, so the system allocates a new stack and continues execution on the new stack. This is denoted by the extension 305 represented as a dashed arrow showing the extension of the stack. This operation causes a "deallocate stack" marker, $e_3$, to be pushed onto the virtual stack.

Figure 3B:
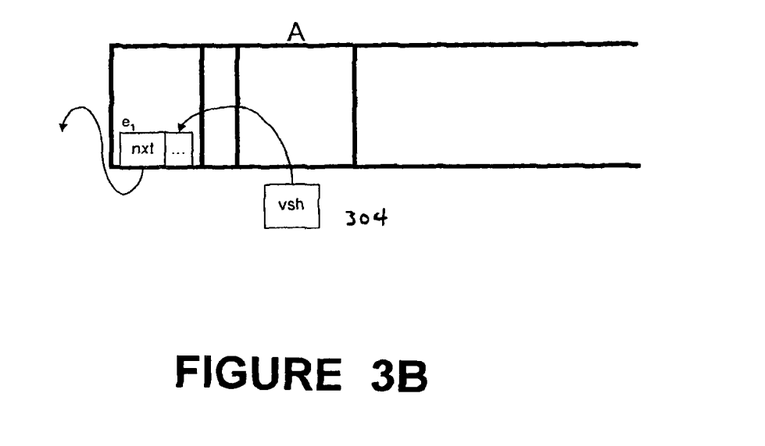
FIG. 3B illustrates the resulting system stack and virtual stack for the example of FIG. 3A, according to an embodiment.

The process of frame C starts a call chain which calls frame D. Within frame D, a synchronization operation is started that locks a particular object. The destructor in this case is an "unlock object" marker, $e_4$, which is pushed onto the virtual stack. Within the synchronization block, frame D starts a call chain that calls frame E. Within frame E, another transaction is started, so an "end transaction" marker, $e_5$, is pushed onto the virtual stack. Within the transaction of frame E, a call chain is started that calls frame F, and frame F contains a cut to continuation k. Frame F can be considered a "cut-to" frame. This cut resumes execution in frame A and discards all of the intervening stack frames. Within frame F, the virtual stack head points to $e_5$, which is different from the vsh field in continuation k, since k contains vsh=$e_1$. Therefore, as part of the cut operation, the virtual stack elements are popped one by one and the corresponding destructor operations are executed, until the virtual stack head is equal to the vsh field in container k (namely $e_1$). Specifically, in the example shown, the second transaction is ended, the synchronization object is unlocked, the new stack is deallocated, and the first transaction is ended, in this order. Note that this is in reverse order to how the elements were originally pushed onto the virtual stack, and this reverse order reflects the required semantics. The resulting system stack and virtual stack are depicted in FIG. 3B.

Figure 4:
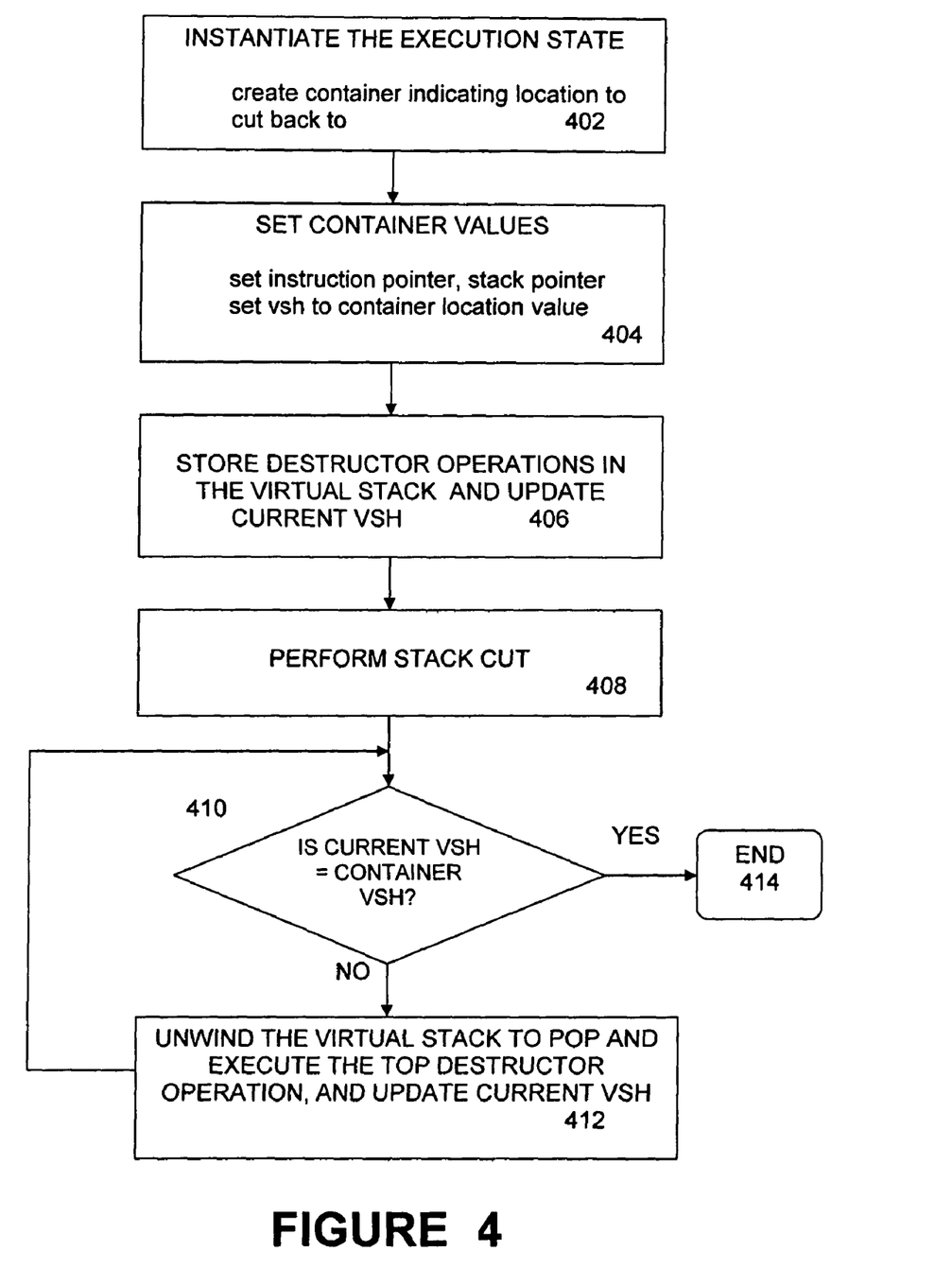
FIG. 4 is a flow diagram of a method of performing a stack cutting operation using a virtual stack, according to an embodiment.

FIG. 4 is a flow diagram of a method of performing a stack cutting operation using a virtual stack, according to an embodiment. In 402, the process begins by taking a snapshot (instantiation) of the current execution state. To do this, the compiler may be configured to allocate space for the container, so that the container indicating the location to cut back to in the event of a stack cut can be created. This container can be passed to a function during execution of the process. In 404, the container values are set and can indicate the values of the instruction pointer, stack pointer, and any other suitable state. To implement the virtual stack mechanism, the container also holds the current value of the virtual stack head in a "vsh" field. As the process executes, the destructor (or marker) elements for any transactions are stored in the virtual stack. The current vsh value is updated with the location of the latest destructor, block 406. In block 410 a stack cut operation is performed. Before updating the thread context values, the current vsh value is compared with the vsh value stored in the container, as shown in decision block 410. If they are the same, the process ends, 414. If they are not the same, there are pending destructors to be executed. In this case, as shown in block 412, the virtual stack is unwound and the top (most recent) destructor operation is popped and executed. The current value of vsh is updated as each successive top destructor operation is executed until it matches the vsh value stored in the container, as shown in the processing loop 412 and 410.

Although the term "destructor" has been used, it should be noted that the destructor can also be any other type of element, such as an arbitrary marker or a marker that starts a new thread, or a marker that hold data that needs to be allocated to a garbage collector when the process executes a stack walk. Similarly a marker could be used to deallocate local object handles, or indicate a transition from managed code to unmanaged code (or vice versa) in a program. Thus the term "destructor" can be construed as an actual destructor element when the process executes a stack cut, or a marker when the processor executes a stack walk.

In certain implementations, the system stack can be extended, in which case the process may include instructions to allocate or deallocate the stack. Embodiments include the mechanisms to handle the processing of stack allocation/ deallocation as well as the implementation of small stacks. The prolog of every method performs a stack limit check, and if the current stack has insufficient space, it allocates a new stack and executes the current method within the new stack, leaving older and deeper stack frames on the original stack. When the current method returns, the new stack is deallocated. In one embodiment, a Java Native Interface (JNI) is used to allow native code to allocate local object handles. This handle space is deallocated when control transfers back to the Java caller. For embodiments based on C++, stack-allocated objects with destructors are required to have their destructors run if an exception is thrown past the stack frame.

Depending upon the actual thread or process being executed, rather complex stack structures can be created, such as a number of stack extensions, nested operations, and so on. In such a case, when certain destructors are executed and removed, certain intermediate frames can also become removed and unreachable. For example, in certain circumstances, one or more of destructor themselves may initiate a stack walk. In this case, the process of unwinding through the destructors can become very complicated and destructors should not be discarded after they are executed. In one embodiment, the virtual stack is configured to hold special markers to facilitate composable cuts and situations in which destructors themselves may perform stack walks or similar operations. The virtual stack holds markers to deallocate a stacklet (a virtual stack entry), block a cut or exception, mark a transition from managed code to unmanaged code, and deallocate local handles, among others. In this embodiment, the destructors are all run in one or more frames above the "cut-to" frame. This preserves all existing stack frames until all destructors are complete. Alternatively, all stacklet deallocations can be deferred until all destructors are complete using a two-pass approach. In the first pass the system ignores the stacklet deallocation destructors, leaving them on the virtual stack. All other destructors are processed and removed. The deferred deallocations will then commit naturally if a new cut or unwind aborts the cut operation. In the second pass, all remaining destructors, which should all be stacklet deallocations, are processed. The system stack is used in case the cut-to frame's stacklet is deallocated. If a destructor cuts or unwinds past the destructor boundary, the original cut is aborted and no further destructors from the original cut are executed, except for the deferred stacklet deallocations. The system may be prevented from unwinding to certain discarded frames, such as any frame between the initial destructor frame and the frame that created the destructors virtual stack exception.

As shown in FIG. 2B, the parameters related to a stack cut operation are stored in a continuation, k. Various different continuation data structures may be implemented according to embodiments. For a "thin" continuation data structure, every static instance of a continuation in the method requires space on the stack frame for the continuation data structure. This includes the instruction pointer (eip) for the first instruction of the continuation and space for continuation arguments. The continuation structure is initialized upon reference, which usually occurs when passing the continuation as an argument to another method. In general, only the eip field needs to be initialized. The continuation arguments are filled in when cutting to the continuation. If a method contains any instantiated continuations, all preserved registers are stored in the prolog of the method. Cutting to a continuation may leave the CPU registers in an unknown state, but cutting as a result of unwinding the virtual stack leaves the registers in known states and does not instantiate the continuation directly in the method.

For a "thin" stack cut operation, the cut routine takes a continuation pointer (which may be held in a register) and a set of arguments. In one embodiment, the arguments are set in the continuation structure based on constant offsets from the continuation pointer. The processor jumps to the code address that the eip field holds. The continuation prolog resets the stack pointer (esp) according to the register holding the continuation pointer. The continuation structure is generally stored at a known location within the stack frame. The continuation prolog may also copy continuation arguments into corresponding variables on the stack frame.

Another type of continuation data structure, referred to as a "fat" continuation data structure may also be implemented. For this embodiment, the data structure contains an additional field that stores the value of TLS.vsh at the time the continuation is instantiated. The vsh may be placed at a negative offset from the continuation data structure pointer. For a "fat" stack cut operation, the cut parameters are stored in the continuation data structure. The virtual stack is unwound until the continuation's vsh field is reached. Each vsh is popped, and the associated destructor is executed. The stack deallocation destructors are deferred until the end of the method. Any attempt to cut or destructively unwind past the "cut-to" frame essentially aborts the current cut. For fat cuts, the destructors are generally placed above the "cut-to" frame, as described above.

To ensure proper execution of the destructor operations, the arguments can be copied to the end of the stack pointer. This allows the destructor to be run above the stack frame that calls the destructor. In this case, the stack pointer is kept at a known location, and thus may impose a strict convention on how a compiler generates a call and manages the stack frames.

In general, implementation of a virtual stack as described herein requires an additional write of the virtual stack head into the continuation data structure when creating the continuation, and an additional comparison when performing the cut operation. When there are destructor operations to execute, there are may be a few memory operations required to set up the destructor according to the contents of the virtual stack element. In general however, this cost overhead is typically minimal compared to the actual destructor operation, which is nonetheless required for correct compositional semantics. It is also certainly minimal compared to standard stack unwinding methods of exception processing in stack-based processing systems.

By using this technique, stack cutting is fully composable with other constructs that require destructor operations, and the cost of a stack cut remains the same regardless of how many stack frames are cut across. There may be an additional cost for each destructor operation in order to make stack cutting fully composable, however this cost will typically be small compared to the performance improvement provided by the stack cut operation itself.

A processing system incorporating the stack architecture of system 100 can include other components (not shown), such as a chipset, system memory devices, one or more interfaces to interface with one or more input/output (I/O) devices, and a network interface, among other components. Further, the system 100 may include other additional components such as other processors (e.g., in a multi-processor system), one or more co-processors, as well as other components.

In a multi-core or multi-processing system, the implementation of a virtual stack can greatly enhance composability of stack cutting processes by allowing the passing of continuations to a library that uses transactions. Destructors for transactions within the library can be registered (pushed onto the virtual stack) and any cut out of the library will commit the transaction since the virtual stack mechanism ensures that the appropriate destructor will be executed and not ignored.

For the purposes of the present description, the term "processor" or "CPU" refers to any machine that is capable of executing a sequence of instructions and should be taken to include, but not be limited to, general purpose microprocessors, special purpose microprocessors, application specific integrated circuits (ASICs), multi-media controllers, digital signal processors, and micro-controllers, etc.

The memory associated with system 100 may be embodied in a variety of different types of memory devices adapted to store digital information, such as static random access memory (SRAM), dynamic random access memory (DRAM), synchronous dynamic random access memory (SDRAM), and/or double data rate (DDR) SDRAM or DRAM, and also non-volatile memory such as read-only memory (ROM). Moreover, the memory devices may further include other storage devices such as hard disk drives, floppy disk drives, optical disk drives, etc., and appropriate interfaces. The system may include suitable interfaces to interface with I/O devices such as disk drives, monitors, keypads, a modem, a printer, or any other type of suitable I/O devices. System 100 may also include a network interface to interface with a network such as a local area network (LAN), a wide area network (WAN), the Internet, etc.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Implementations may also include microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

While the term "component" is generally used herein, it is understood that "component" includes circuitry, components, modules, and/or any combination of circuitry, components, and/or modules as the terms are known in the art.

The various components and/or functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples for, the systems and methods are described herein for illustrative purposes, various equivalent modifications are possible, as those skilled in the relevant art will recognize. The teachings provided herein may be applied to other systems and methods, and not only for the systems and methods described above. The elements and acts of the various embodiments described above may be combined to provide further embodiments. These and other changes may be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. Accordingly, the inventors reserve the right to add additional claims after filing the application to pursue such additional claim forms for other aspects as well.

What is claimed is:

1. A method for facilitating a stack cutting operation, the method comprising:

storing execution parameters associated with an execution instance in a first stack frame of a system stack, the execution parameters including a virtual stack pointer start field with a value of a first address corresponding to a location of the first stack frame;

adding destructor instructions, of a program thread, to a virtual stack associated with the system stack as the program thread is executed, wherein storing the destructor instructions includes updating a value of a virtual stack pointer with a second address corresponding to a latest destructor instruction added to the virtual stack such that the virtual stack pointer points to the latest destructor instruction; and upon execution of a stack cut operation from a second stack frame of the system stack to the first stack frame of the system stack, comparing the value of the virtual stack pointer with the value of the virtual stack pointer start field, and executing a destructor instruction pointed to by the virtual stack pointer and updating the virtual stack pointer to point to the destructor instruction preceding the executed destructor instruction until the value of virtual stack pointer matches the value of virtual stack pointer start field.

2. The method of claim 1, wherein the virtual stack is part of the system stack, and wherein adding the destructor instructions to the virtual stack comprises storing the destructor instructions in stack frames above the second stack frame.

3. The method of claim 1, wherein the destructor instructions comprise operations that resolve a program element that requires resolution during the execution of the stack cut operation, and wherein the program element comprises one of a transaction, synchronization operation, lock operation, unlock operation, a stack allocate operation, and a stack deallocate operation.

4. The method of claim 1, wherein the execution parameters associated with an execution instance comprise a container data structure including fields for an instruction pointer, a stack pointer, and the virtual stack pointer start field.

5. A system for facilitating stack cutting operations in a processor, the system comprising:
   a program memory to store an executable program;
   a system stack accessing the program memory, wherein locations of the system stack are referenced by a stack pointer, and wherein the system stack stores execution parameters associated with an execution instance of the executable program in a first stack frame, the execution parameters including a virtual stack pointer start field with a value of an address of the first stack frame;
   a virtual stack associated with the system stack, and configured to store destructor instructions as a thread of the executable program is executed, the virtual stack including a virtual stack pointer that points to a latest destructor instruction added to the virtual stack; and
   a processing unit coupled to the system stack, the processing unit configured to execute the destructor instructions upon invoking a stack cut operation from a second stack frame of the system stack to the first stack frame, the processing unit to
      compare a value of virtual stack pointer with the value of virtual stack pointer start field, and
      execute the latest destructor instruction pointed to by the virtual stack pointer and update the virtual stack pointer to point to a destructor instruction preceding the latest destructor instruction, until the value of virtual stack pointer matches the value of virtual stack pointer start field.

6. The system of claim 5, wherein the virtual stack is part of the system stack, and wherein the destructor instructions stored in the virtual stack are stored in stack frames above the second stack frame of the system stack.

7. The system of claim 5, wherein the destructor instructions comprise operations that resolve a program element that requires resolution during the stack cut operation, and wherein the program element comprises one of a transaction, synchronization operation, lock operation, unlock operation, a stack allocate operation, and a stack deallocate operation.

8. The system of claim 5, wherein the execution parameters associated with an execution instance comprise a container data structure including fields for an instruction pointer, a stack pointer, and the virtual stack pointer start.

9. The system of claim 5, wherein the virtual stack pointer also points to a next preceding system stack frame that contains a destructor instruction.

10. The system of claim 9, wherein the virtual stack pointer is updated with an address corresponding to the latest destructor instruction as the destructor instructions are added to the virtual stack.

11. The system of claim 5, wherein the virtual stack is generated by a compiler program translating source code to a target language executable by the processing unit of the system.

12. A computer-readable medium having stored thereon instructions, which, when executed in a system, cause the system to perform the operations of:
   storing execution parameters associated with an execution instance in a first stack frame of a system stack, the execution parameters including a virtual stack pointer start field with a value of a first address corresponding to a location of the first stack frame;
   adding destructor instructions, of a program thread, in a virtual stack associated with the system stack as the program thread is executed, wherein storing the destructor instructions includes updating a value of the virtual stack pointer with a second address corresponding to a latest destructor instruction added to the virtual stack such that the virtual stack pointer points to the latest destructor instruction in the virtual stack; and
   upon execution of a stack cut operation from a second stack frame of the system stack to the first stack frame of the system stack,
      comparing the value of virtual stack pointer with the value of virtual stack pointer start field, and
      executing a destructor instruction, pointed to by the virtual stack pointer and updating the virtual stack pointer to point to the destructor instruction preceding the executed destructor instruction until the value of virtual stack pointer matches the value of virtual stack pointer start field.

13. The medium of claim 12, wherein the destructor instructions comprise operations that resolve a program element that requires resolution during the stack cut operation, and wherein the program element comprises one of a transaction, synchronization operation, lock operation, unlock operation, a stack allocate operation and a stack deallocate operation.

14. The medium of claim 12, wherein the execution parameters associated with an execution instance comprise a container data structure including fields for an instruction pointer, a stack pointer, and the virtual stack pointer start.

15. The medium of claim 12, wherein the instructions are generated by a compiler program translating source code to a target language executable by a central processing unit of the system.

* * * * *